United States Patent
Hämäläinen et al.

(10) Patent No.: US 6,289,217 B1
(45) Date of Patent: Sep. 11, 2001

(54) ADAPTIVE RADIO LINK

(75) Inventors: Seppo Hämäläinen, Espoo; Oscar Salonaho, Helsinki; Niina Laaksonen; Antti Lappeteläinen, both of Espoo, all of (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/153,723

(22) Filed: Sep. 15, 1998

(30) Foreign Application Priority Data

Sep. 17, 1997 (FI) ........................................................ 973717

(51) Int. Cl.⁷ .............................. H04Q 7/20; G01R 31/08
(52) U.S. Cl. ......................... 455/425; 455/436; 455/522; 370/252
(58) Field of Search ..................................... 455/436, 437, 455/438, 422, 522, 67.1; 370/252, 332, 333, 468, 425

(56) References Cited

U.S. PATENT DOCUMENTS

| | | | |
|---|---|---|---|
| 5,034,993 | 7/1991 | Sasuta et al. | 455/11 |
| 5,327,576 * | 7/1994 | Uddenfeldt et al. | 455/436 |
| 5,513,213 * | 4/1996 | Patel et al. | 375/222 |
| 5,701,294 * | 12/1997 | Ward et al. | 370/252 |
| 5,828,672 * | 10/1998 | Labonte et al. | 714/708 |
| 5,920,545 * | 7/1999 | Rasanen et al. | 370/232 |
| 5,974,106 * | 10/1999 | Dupont et al. | 375/377 |
| 5,991,618 * | 11/1999 | Hall | 455/425 |
| 6,006,092 * | 12/1999 | Ward et al. | 455/438 |

FOREIGN PATENT DOCUMENTS

| | | |
|---|---|---|
| 19620843 A1 | 11/1997 | (DE) . |
| 0641093 A2 | 3/1995 | (EP) . |
| WO 97/01229 | 1/1997 | (EP) . |
| 94810 | 7/1995 | (FI) . |
| WO 97/13388 | 4/1997 | (WO) . |
| WO 97/15131 | 4/1997 | (WO) . |

OTHER PUBLICATIONS

"Adaptive Modulation/TDMA Scheme for Large Capacity Personal Multi–Media Communication Systems", Sampei et al., IEICE Transactions on Communications, E77–B, 1994.
European Search Report.
Finnish Official Action.

\* cited by examiner

*Primary Examiner*—Vivian Chang
*Assistant Examiner*—Charles N. Appiah
(74) *Attorney, Agent, or Firm*—Perman & Green, LLP

(57) ABSTRACT

A radio connection is adapted to an environment changing over the connection in a cellular radio system where the radio traffic between the base station and the mobile stations is arranged on a multiple access principle, according to a given frame structure (402). For a given radio connection between the transmitting device and the receiving device, there is reserved a given data transmission capacity in said frame structure. The receiving device measures the connection quality (103) during the connection, and on the bases of the measured connection quality, the size of the data transmission capacity (104, 110) reserved for said connection in said frame structure is changed.

13 Claims, 5 Drawing Sheets

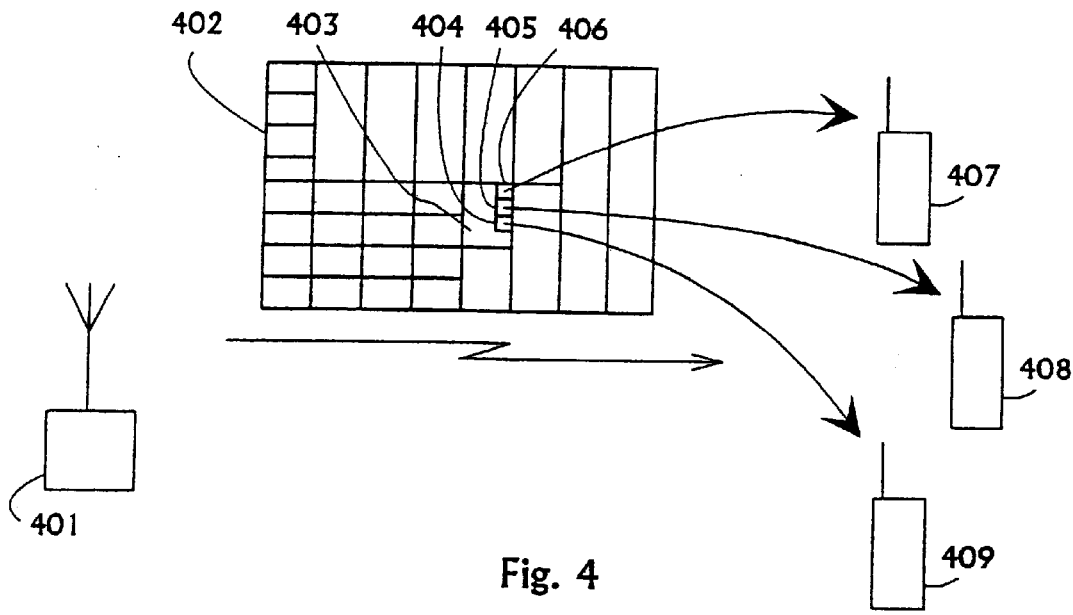
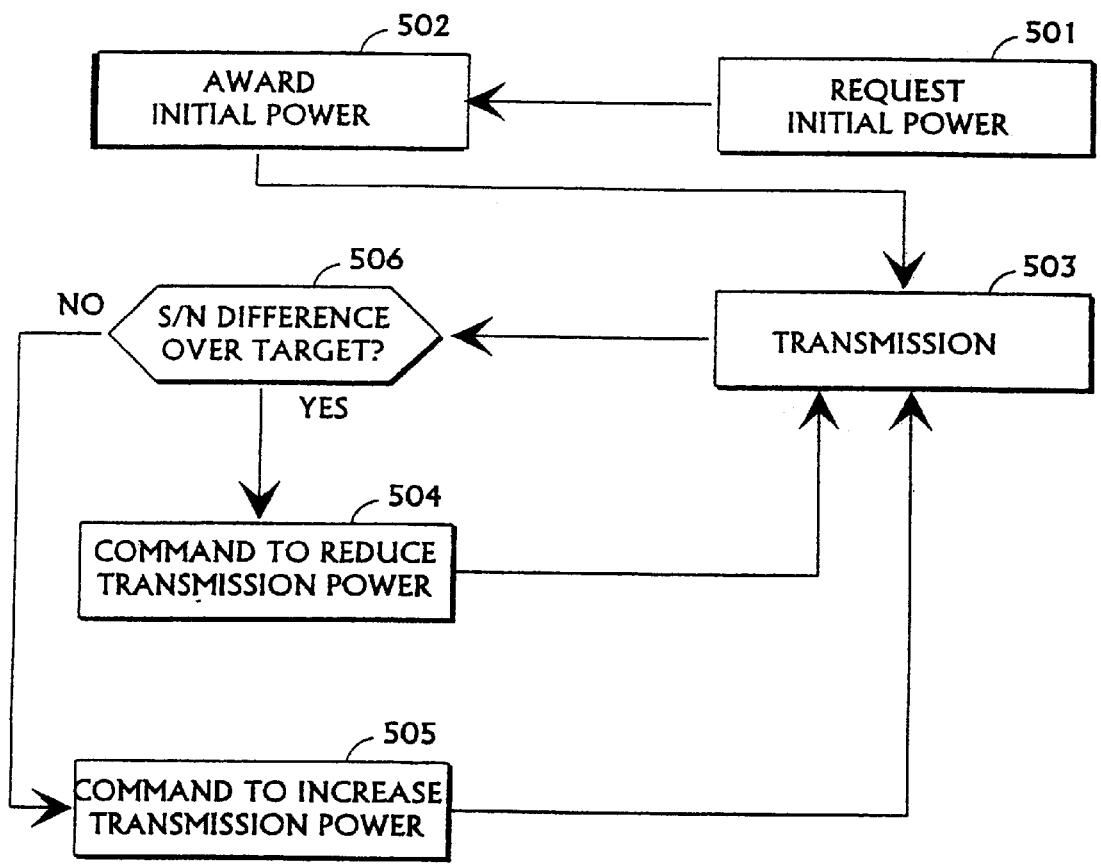
Fig. 4
Fig. 5

ADAPTIVE RADIO LINK

TECHNICAL FIELD

The invention relates generally to adapting a radio connection to the amount of data to be transmitted and to the prevailing radio traffic environment. In particular, the invention relates to such an adaptation that may take place both in the beginning and during the radio connection.

BACKGROUND OF THE INVENTION

Second-generation cellular radio systems, such as D-AMPS (Digital Advanced Mobile Phone Service), GSM (Global System for Mobile telecommunications) and PDC (Personal Digital Cellular), are mainly meant for such telephone connections that all have the same data transmission rate. In addition to telephone connections, in the future there will be made many different connections over the radio interface, such as real-time and non-real-time data transmission connections and video calls The required data transmission rate can vary largely between the different connections, and it may even change during the communication. Moreover, the interference that variably occurs in the radio connection may require coding on different levels in order to transmit the information carried in the connection to the receiver in a feasible form.

In systems based on TDMA (Time Division Multiple Access), a given time slot is allocated for the use of each single connection, the time slot being part of a cyclically repeated frame structure at a given carrier wave frequency. In systems based on CDMA (Code Division Multiple Access), the corresponding basic unit allocated for the use of a connection is a given division code within a given carrier wave frequency. In their original form, second-generation cellular radio systems do not allow the allocation of more than one basic unit for one connection at a time, but in order to make the distribution of data transmission capacity more flexible, various different suggestions have been made as to how more division codes, frame time slots or carrier wave frequencies could be allocated for a high-capacity connection. In addition to circuit-switched telephone connections, there are suggested methods and systems for creating packet-switched data communication. A packet-switched connection is easily adapted to variations in the quantity of transmittable data, because the number of packets to be transmitted per time unit depends on the quantity of data to be transmitted at each point of time and on the available data transmission capacity.

In radio communication, the nature of interference is fading or noise. In order to compensate said interference, cellular radio systems generally use adjusting of the transmission power, so that the transmitting device by some method defines the lowest possible power by which the transmitted signal is received as sufficiently strong from the point of view of the receiving device. For compensating interference, there also is sometimes used frequency hopping, i.e. rapid variation of the transmission and reception frequencies. In order to enable the receiver to interpret the signal correctly in spite of interference, the transmitter may interleave and code the signal prior to transmitting.

All such measures that aim at maximising the quality of the radio connection and the effective use of resources and at the same time at minimising the power consumption caused by transmission and reception can together be called adapting of the radio link. In a third-generation cellular radio system, the frame structure of the radio interface will be considerably more complex than in current systems, which fact sets remarkably increased requirements to the adapting of the radio link. As an example of a third generation frame structure, let us study a frame structure that was introduced in the Finnish patent application No. 964,308 and in the corresponding U.S. patent application Ser. No. 802,645, filed on Feb. 19th, 1997. Each frame is divided into a predetermined number of time slots. Each time slot can be further divided either into smaller time slots or sections of the size of one division code or one narrow frequency band. Time slots and parts of them, divided in some other fashion, can together be called slots. Time slots can be divided into slots in different ways, so that one frame may contain slots of varying sizes. The part with the smallest data transmission capacity contained by the frame, which part as a whole can be allocated for the use of one data transmission connection, is called a resource unit. In separate cells, the frame structure can be divided into slots of various sizes by various different methods.

The requirements set for the adaptation of the radio link depend either on an increase or decrease in the interference level or on fluctuations in the quantity of source data to be transmitted. If the general interference level rises due to other simultaneous radio transmissions or when the propagation conditions of the radio waves on the path between the transmitter and the receiver change, the quality of the radio connection weakens. By adapting the radio link, the quality of the radio connection is attempted to be maintained above a given minimum limit. The quality of the connection is described for instance by the Bit Error Ratio (BER), the Frame Error Ratio (FER), the data transmission delay and/or the number of erroneous received bursts as compared to the number of all received bursts. If the quantity of the source data varies in time, the adapting of the radio link must aim at a situation where all source data is transmitted to the receiver within a given maximum delay. On the other hand, the data transmission capacity of the radio interface must not be kept reserved in vain for any single connection, when the quantity of transmitted data is decreased.

SUMMARY OF THE INVENTION

The object of the present invention is to introduce a method and system whereby a radio link in a third-generation cellular radio system can be adapted to varying interference circumstances and to a varying quantity of source data.

The objects of the invention are achieved by a method which combines the adjusting of the transmission power and a dynamic variation of the data transmission capacity reserved for a given connection. The latter feature is based on measuring the connection quality.

The method according to the invention is designed for adapting a radio connection to an environment changing over said connection in a cellular radio system where the radio traffic between the base station and the mobile stations is arranged on a multiple function principle according to a given frame structure. In said method, form a given connection between a transmitting and a receiving device, there is reserved a given data transmission capacity of said frame structure. The method according to the invention is characterised in that during the connection, the receiving device measures the connection quality, and on the basis of the measured connection quality, the data transmission capacity reserved for said connection in said frame structure is changed.

Most advantageously the invention is applied in a third-generation cellular radio system, where the concept 'bearer' is used for describing the connection between the base station and the mobile station. Here bearer means the entity formed by all such factors that affect the data transmission between the base station and a given mobile station. The concept bearer includes, among others, data transmission rate, delay, bit error ratio and fluctuations in these within given minimum and maximum values.

The bearer can also be understood as a data transmission path created due to the combined effect of all these factors, said path connecting the base station and a given mobile station, through which path it is possible to transmit useful data, i.e. payload information. One bearer always connects only one mobile station to the base station. Multiple function mobile stations can simultaneously maintain several bearers that combine the mobile station to one or several base stations.

In connection with the bearer setup, there are selected values for certain basic parameters, and among the factors affecting the definition of said values let us point out the type of the transmitting and receiving device and their capability to use various modes of operation, such as data transmission rates, modulation methods of varying degrees and various coding arrangements. Among the basic parameters let us mention for example coding rate, coding type, modulation order, interleaving depth, interleaving type, burst type and, above all, the size of the slot (or the number and size of the slots) reserved in the employed frame structure for the bearer in question. The concept 'burst' means the quantity of data that is transmitted in one slot of the frame structure. Each basic parameter can have several possible values in order to make each bearer that is set up to respond as well as possible to the capabilities of both the transmitting and the receiving device and to the data transmission demand at the moment in question. On the other hand, the plurality of the basic parameter values may also cause confusion and excessive signalling; in order to prevent this it can be agreed that only some combinations of the basic parameter values are allowed. The bearer setup takes place, apart from the beginning of a call or some other communication, also in connection with the changing of base station, i.e. the handover. Some basic parameter values can also be transmitted between the base station and the mobile station when the mobile station is in so-called idle mode, i.e. a call or other active connection is not going on.

According to the invention, the radio link adaptation taking place after the bearer setup is carried out in a somewhat different procedure depending on whether we are talking about a real-time (RT) or non-real-time (NRT) data transmission. Real-time data transmission is often called delay-critical data transmission, and for an RT bearer there is typically reserved in the frame structure a given slot or slots that are repeated from frame to frame in equal size. For an NRT bearer, there are typically allocated time slots from various frames according to how many are available after the reservations made for the RT bearers; however, a given fixed minimum reservation can also be made for an NRT bearer. In addition to this RT/NRT difference, the radio link adaptation according to the invention can also be divided into modulation and transmission power adjusting carried out on the basis of the connection quality or source data quantity.

Let us assume that the source data quantity is constant. In the frame structure, there is reserved a given slot or slots for a given bearer. The radio link adaptation based on the connection quality takes place as follows: if the connection quality deteriorates, more capacity, i.e. a larger slot or more slots are reserved in the frame structure for the bearer in question. In order to utilise the obtained larger data transmission capacity, the transmitting device increases the coding rate, changes the coding type or decreases the modulation order, so that in the data to be transmitted, there is created more redundancy or a clearer modulation, on the basis of which the receiving device can easily reconstruct the data correctly irrespective of interference. Respectively, if the connection quality is particularly good, the amount of capacity reserved for the bearer in question in the frame structure is reduced, so that the transmitting device must decrease the coding rate, change the coding type or increase the modulation order in order to make all data being transmitted to fit in the reserved capacity. Now the redundancy of the transmitted data and the clarity of the modulation are decreased, but if the connection quality is good, the receiving device can still reconstruct the data correctly.

In each cell, the base station maintains reservation tables that indicate the reservation situation of both downlink and uplink frames. In order to be able to change the reservation situation, it must be assumed that each cell has a given defined mechanism by which the mobile stations can request an increase or decrease in the number and/or size of the slots reserved for a given bearer, and by which the base station can inform the mobile stations of respective changes made in the reservation situation. The present invention does not restrict the realisation of such mechanisms; suitable mechanisms are described for instance in the above mentioned Finnish patent application No. 964,308.

The radio link adaptation taking place on the basis of the connection quality requires that the connection quality can be described by some unambiguous function. The measuring of the connection quality in the receiver can be based for example on the C/I ratio, i.e. the Carrier to Interference ratio, in which case the unambiguous function Q describing the connection quality and its dependence on the C/I ratio can be expressed for instance by the formula $Q=f(C/I)$. If the signal transmission uses interleaving that spreads the bits contained in a given data sequence to be transmitted in several bursts during a given interleaving period, the C/I presented in the formula as the argument of the function can be a vector, i.e. a number of values, each of which describes the detected carrier to interference ratio of one single burst belonging to a given interleaving period.

BRIEF DESCRIPTION OF THE DRAWINGS

The invention is explained in more detail below, with reference to the preferred embodiments presented by way of example, and to the appended drawings where FIG. 4 illustrates some power adjusting messages in the frame structure, FIG. 5 illustrates the adjusting of transmission power as part of the method according to the invention.

DETAILED DESCRIPTION OF THE INVENTION

Figure 1:
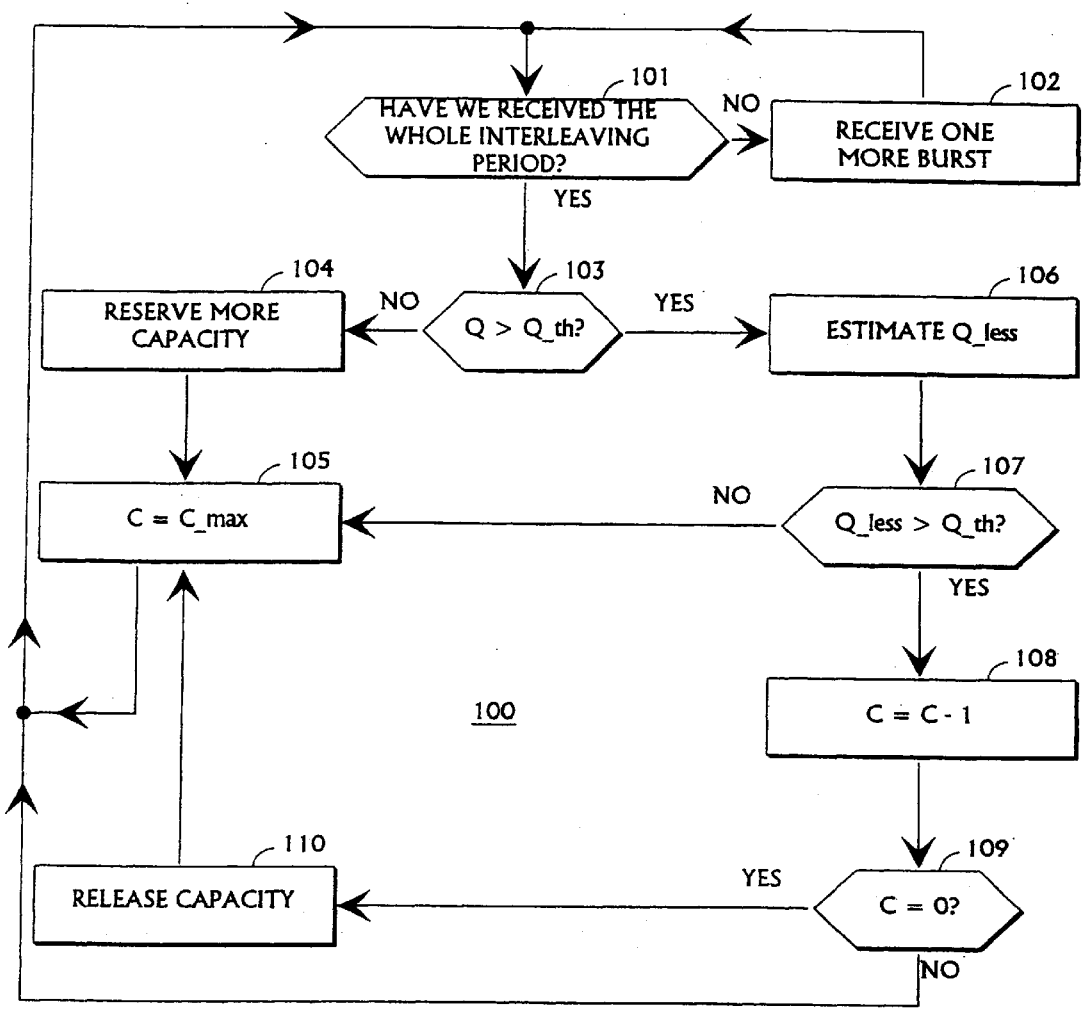
FIG. 1 illustrates an algorithm according to the invention.

A radio link adaptation related to a given RT bearer and taking place on the basis of the connection quality most advantageously consists of two parts. The first part is a reference algorithm that compares the measured connection quality (i.e. the value of the function Q) with given threshold values and, when necessary, produces, on the basis of this comparison, a request to increase or decrease the size and/or number of slots reserved for the bearer in question. The second part is an adjusting loop that maintains said threshold values and, when necessary, changes them so that the requests produced by the reference algorithm are in correct proportion to the capability of the receiver to reconstruct the received data correctly. FIG. 1 is a flowchart of a preferred application of the reference algorithm 100. In mode 101, the receiver checks, after receiving a given burst, whether it has received all bursts belonging to one interleaving period. If not, the receiver receives one burst more in mode 102 and returns to mode 101. When all bursts belonging to one interleaving period are received, the receiver performing the algorithm 100 changes over to mode 103 where it finds out whether the value of the function Q describing the connection quality is higher than the threshold value Q_th describing minimum quality. If not, a request is produced for the bearer in question in order to increase the size and/or number of reserved slots in mode 104. In mode 105, a given counter C is set at its positive maximum value C_max, whereafter mode 101 is resumed in order to receive the next burst.

The threshold value Q_th describing minimum value also is the target value: the value of the function Q describing the connection quality should fall as near as possible to the value Q_th, but so that Q>Q_th. This is because a value of the function Q that is remarkably higher than Q_th means that an unnecessarily large portion of the capacity in the frame structure is reserved for the bearer in question. If in mode 103 it is observed that the value of the function Q is higher than Q_th, there is assumed mode 106 where the receiver estimates what would be the value of the function Q if the capacity reserved for the bearer were reduced by one resource unit. The value obtained by means of estimation can be denoted with the symbol Q_less. We shall below describe some advantageous methods for forming the estimate Q_less. In mode 107 it is studied whether Q_less is higher than the value Q_th describing the minimum and target level. If not, there is assumed mode 105 and via it, the initial mode 101. If the result of the comparison carried out in mode 107 is positive, the value of the counter C is reduced by one in mode 108, and in mode 109 it is detected whether the value of the counter C has reached zero. The value of the counter C describes how many "too good" values of the function Q should still be measured before it were profitable to decrease the capacity reserved for the bearer. If it is detected that the value of the counter C has reached zero in mode 109, there is produced, according to mode 110, a request for the bearer in question in order to decrease the size and/or number of slots reserved for the bearer, and mode 101 is resumed via mode 105. However, if in mode 109 it is found out that the value of the counter C is higher than zero, the initial mode 101 is resumed directly.

The algorithm represented in FIG. 1 decreases the reserved capacity only if a certain number, corresponding to the highest value C_max of the counter C, of "too good" values of the function Q are measured successively. In an alternative embodiment, instead of the suggested counter C, there can be set a condition according to which the reserved capacity is reduced, if among N performed measuring cycles, in M cycles it is detected that the estimate Q_less is higher than the value Q_th describing the target level, where N and M are positive integrals and N>M. Thus it is not required that such values of the estimate Q_less that are higher than the target level Q_th should be obtained by means of successive measuring cycles in particular.

The estimate Q_less can be formed in many different ways. In a preferred embodiment, in the receiver there is recorded in advance a table that describes the correspondence between measured C/I values and the value of the function Q. Now the receiver can in mode 106 leave the value of the carrier to interference ratio describing one burst out of the vector C/I, used last in mode 103 as the argument of function Q=f(C/I), and define the value Q_less by means of the table. Another alternative is that the receiver leaves one received burst completely undemodulated and undecoded and calculates the value of the function Q only on the basis of other bursts belonging to the interleaving period. If in the mode 103 of the algorithm 100, in addition to a simple magnitude comparison, it is possible to detect how much larger than the threshold value Q_th the measured value Q is, it is then possible, in a corresponding fashion, to calculate in mode 106 an estimate Q_less for a case where the reserved capacity would be reduced only by one resource unit (when Q has been observed to be only a little larger than Q_less), or for a case where the reserved capacity would be reduced by several units (when Q has been observed to be remarkably larger than Q_less). Likewise, from mode 103 there can be a coupling to mode 108, so that if said Q is much larger than Q_less, the value of the counter C is reduced in mode 108 by more than one.

The algorithm illustrated in FIG. 1 can be modified in other ways, too, without deviating from the scope of the novel idea of the present invention. Instead of mode 104, there can be arranged for example another counter loop like modes 108, 109 and 110, which produces a request demanding an increase in capacity only when the value of the function Q has K times successively been lower than the threshold value Q_th, where K is a positive integral. Also in an alternative embodiment of such a counter, it is possible to observe, instead of such successive values of the function Q that are lower than Q_th, whether in N measurements there occur at least M too bad values of the function Q. Both mode 104 in FIG. 1 and the described loop can naturally be provided with all such modifications that were described above, with reference to the fact that in mode 103, it would be possible to detect, in addition to a simple magnitude comparison, also the size of the difference of the values Q and Q_th. The fact is that if the detected quality of the connection is remarkably poorer than the target level, additional capacity must be obtained rapidly enough, in order to avoid an interruption in the transmission due to bad quality. A request for increasing capacity, formed in mode 104, can contain information as to how many resource units the assumed quantity of the required additional capacity contains.

The algorithm 100 illustrated in FIG. 1 is advantageously parametrised so that the values Q_th and C_max, as well as possibly other corresponding threshold and limit values are not fixed, but they can be modified for instance on the basis of a measurement of the traffic situation carried out by the base station, on the basis of a bit error ratio or frame error ratio measurement carried out by the base station or a mobile station, or on the basis of a manual setting made by the operator. If for example the traffic situation measurement carried out by the base station shows that the base station is overloaded and cannot respond to all requests to establish a connection, the base station can command that its cell uses a Q_th and/or C_max value that is lower than previously, so that with respect to active bearers, a poorer connection quality is accepted, and capacity is released for the use of the new bearers to be set up. Another alternative is that with respect to each bearer, during an interval that is longer than one interleaving period, there is detected how many bit errors occur in the reception; hence, a high or increasing rate of bit errors would increase the value Q_th and/or the value C_max, and respectively a low or decreasing rate of bit errors would reduce the value Q_th and/or C_max. The measurement of errors, delays or other factors deteriorating the connection and the resulting optimisation of the Q_th and/or C_max values can also be concentrated in some defined mobile station group that can contain all mobile stations functioning under a given base station or only part thereof. If the Q_th and/or C_max values are optimised on the system level, the measurements may even be carried out within the range of several base stations. In measurements carried out in a large group, even rare errors are better found out. An algorithm that attempts to keep the values Q_th and C_max and possible other parametrised threshold and limit values optimal is above called the adjusting loop.

In the mode 101 of FIG. 1, there is started the calculation of the value of the function Q, aiming at the adaptation of the radio link, after the end of each interleaving period. By setting the value C_max sufficiently high (typically 10–100), it is, however, possible to make sure that the radio link adaptation does not cause excessive signalling between the mobile station and the base station. When necessary, it is naturally possible to set a limit to mode O1, according to which limit the value of the function Q is calculated at longer intervals, for instance only after each fifth interleaving period. This, however, slows down the reacting to a sudden drop in the connection quality. If the bearer in question for example has a pause due to discontinuous transmitting, DTX, the algorithm 100 can be applied so that during the pause, the receiver observes one of the channels common for the whole cell, or some other transmission, and on the basis thereof estimates the value Q in mode 103. Thus it is possible to take into account at least the increase in the general interference level, and the adaptation of the radio link is not interrupted even if the bearer in question has a pause. The possibility of having a shorter or longer interval between successive calculations of the function Q allows the invention to be applied to various cellular radio systems, because in each system there may be a different amount of capacity available for the corresponding calculations. One suitable area of application for the invention is a WB-TDMA scheme (WideBand Time Division Multiple Access) such as the one selected for the UMTS system (Universal Mobile Telecommunications System) that is to replace the known GSM system in the future.

Let us next observe radio link adaptation related to real-time data transmission and based on the amount of source data, which is called real time forward link adaptation, RT FLA. In the simplest case, on the basis of the source data quantity, there are not changed other basic parameters of the bearer than the size and/or number of the slots reserved in the frame structure. This, however, requires that the changes taking place in the source data quantity are in size exactly such that they can be compensated by increasing or reducing an allowed number of slots. It is more probable that the source data quantity changes in nearly random steps, so that in addition to the basic parameters of the bearer, it is necessary to change coding rate, coding type and/or modulation order. In each reservation request of the slots of the frame structure it is announced how many resource units' worth of slots would be the minimum reservation for the bearer in question, assuming that the coding and modulation remain unchanged. The slot reservation request can, instead of the number of resource units, also contain some more general indication as to the quantity of the data to be transmitted, in which case the algorithm maintaining the frame structure interprets the capacity need and reserves slots for the connection in question according to the free space left in the frame structure (for example a few larger slots or several smaller slots). If, as a consequence of the reservation request the cells reserved for the bearer in question contain extra space, it can be filled with repetition or some other method increasing redundancy. If, on the other hand, there is too little space, the data to be transmitted must be punctured in order to make it fit in the space reserved for it. It is most profitable to carry out the repetition and puncturing operations so that their influence is distributed evenly to all slots reserved for the bearer in question.

Figure 2:
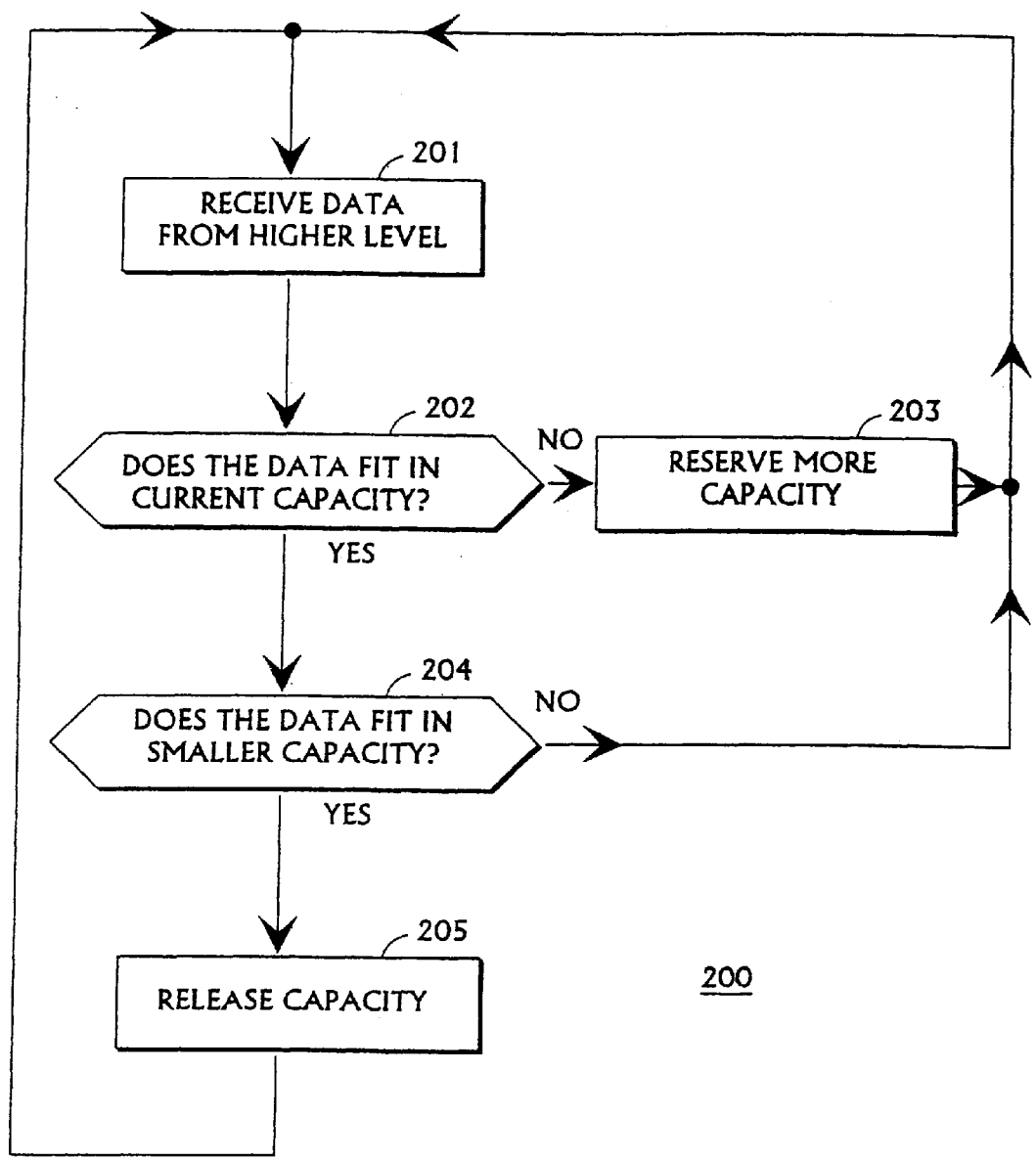
FIG. 2 illustrates another algorithm according to the invention.

A radio link adaptation algorithm functioning in the transmitting device and based on the amount of source data can be operated for instance in the manner described in FIG. 2. In mode 201, that protocol level or the transmitting device that contains the radio link adaptation algorithm, receives data from a given higher protocol level. In mode 202, the quantity of source data transmitted by the higher protocol order is investigated. Most advantageously this is carried out always when the time left before transmitting the next PDU (Protocol Data Unit) is equal to the time that it probably takes from sending the request for reserving new slots to receiving the acknowledgement for reserved new slots, added by a given delay margin. If the quantity of new data is so large that it would not fit in the slots so far reserved in the frame structure, the algorithm sends, according to mode 203, a request for reserving new capacity for an "extra" amount of data. If the quantity of the new data is observed to be remarkably smaller than what would fit in the frame structure slots reserved so far, the algorithm sends, according to mode 205, a request for releasing capacity. In the latter case, there can be applied a delay realised by a given counter, in similar fashion as with the counter C in the algorithm 100 of FIG. 1, or by using an alternative condition of the type "M out of N" that was described above.

In the transmitting device, the protocol level realising the radio link adaptation algorithm may regularly receive the source data from the higher protocol level so late that it has no time to send the request for reserving additional capacity before the data must already be transmitted further. Now it is not possible to use the RT FLA algorithm 200 illustrated in FIG. 2. We can, however, suggest an embodiment of the invention where, while the source data quantity fluctuates, for the bearer there is permanently reserved a given share of extra capacity in the frame structure. As long as the source data quantity does not change, the transmitting device fills the extra capacity by using repetition or other such procedure that increases redundancy in the data to be transmitted. If the quantity of the data to be transmitted grows, the repetition or other such method for increasing redundancy is respectively decreased. If, on the other hand, the source data quantity decreases, the repetition or other such method for increasing redundancy is respectively increased.

This type of embodiment is advantageously combined with a radio link adaptation algorithm 100 according to FIG. 1, carried out in the receiving device, which algorithm is based on the connection quality. Now for a bearer with a source data quantity that may change there is set a somewhat higher threshold value Q_th than for a bearer whose source data quantity remains constant and who has the same goal with respect to the bit error ratio and maximum delay. If the source data quantity now increases, an extra repetition or other coding is decreased, which is seen in that the Q value calculated in the receiver decreases. This can in turn trigger on a procedure according to algorithm 100 for reserving additional capacity. If, on the other hand, the source data quantity decreases, an extra repetition or other coding makes the value Q calculated by the receiver rise even higher, which in turn triggers on a procedure according to algorithm 100 for reducing extra reserved capacity. Thus the transmitting device does not have to send any requests to the effect of changing the reserved capacity, but radio link adaptation takes place on the basis of the connection quality measurements carried out by the receiving device.

Figure 3:
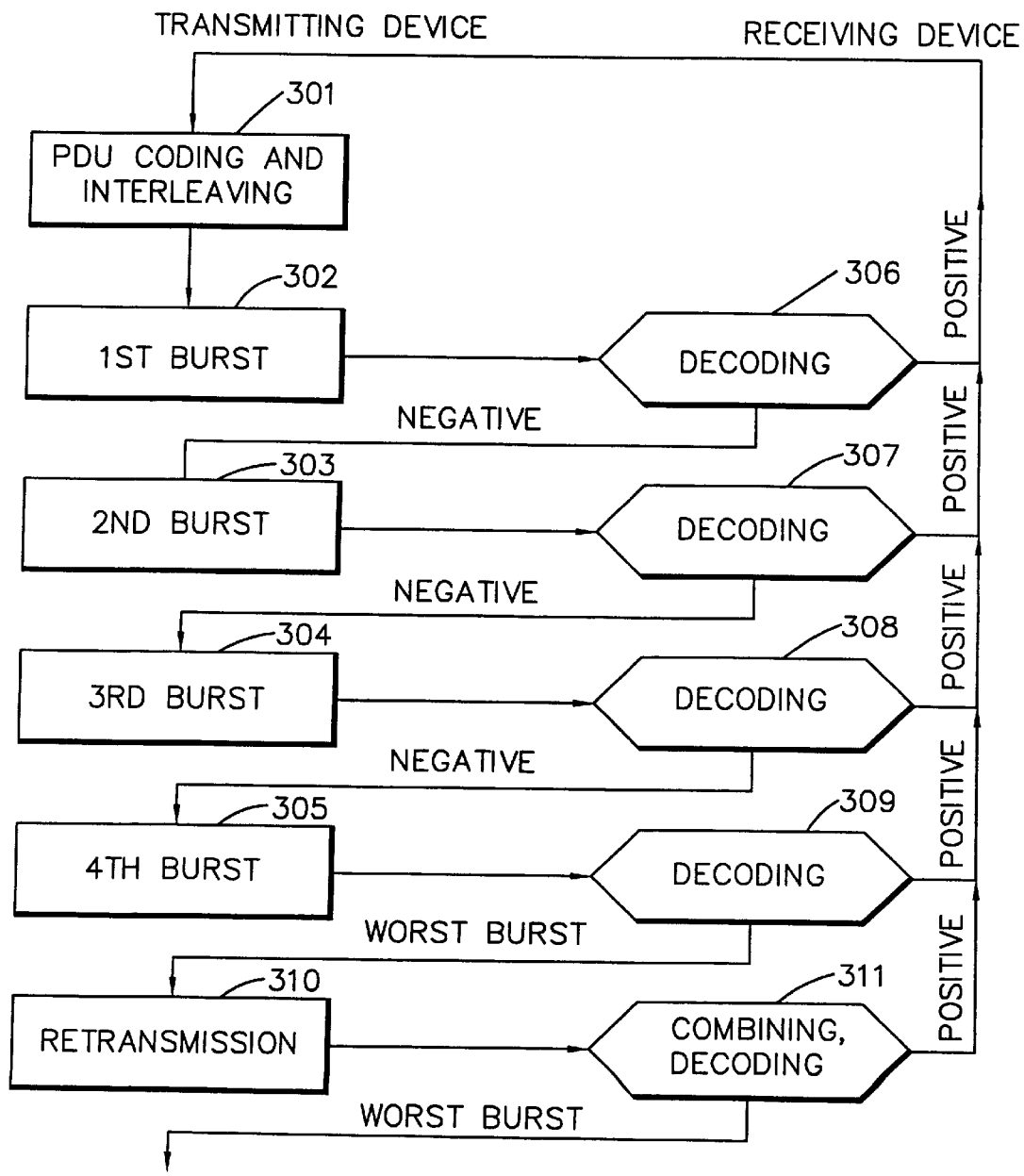
FIG. 3 illustrates retransmission as a part of the method according to the invention.

Next we shall explain the adaptation of a radio link connected to non-real-time data transmission with reference to FIG. 3. For a non-real-time data transmission, changes in the source data are not similarly significant as for real-time data transmission. For transmission, the source data is according to mode 301 subjected to channel coding and interleaving, so that a given data sequence is interleaved for the duration of a relatively short period (usually 2–8 bursts; in FIG. 3 four bursts), and that said data sequence can be completely decoded already before all bursts belonging to said interleaving period are received. The transmission of bursts is represented by modes 302, 303, 304 and 305. The receiving device tries, in modes 306, 307, 308 and 309, to decode said data sequence after each received burst and sends, along with the acknowledgement, a message of the success (positive) or failing (negative) of the decoding for the transmitting device. The transmitting device sends the next burst connected to said data sequence only if the receiving device until then has not correctly decoded the data sequence. If all burst are transmitted but the decoding is still unsuccessful, there follows an ARQ (Automatic Repeat reQuest) type retransmission. The receiving device studies in mode 309 as to which of the bursts that it transmitted was poorest in quality and requests the transmitting device to retransmit said burst according to mode 310. In order to improve demodulation, the original burst and its retransmitted copy are combined in mode 311 by employing a known diversity-type method, where by multiplication and addition, there is obtained a result corresponding to the burst that was the target of retransmission, said result representing the highest correlation between the original burst and its retransmitted copy. The announcing and retransmission of the worst burst continues until the decoding succeeds, or until a given timer of the retransmission prevents further attempts at retransmission (not illustrated in the drawing).

In non-real-time data transmission, the radio link adaptation takes place through the above described coding and interleaving function as well as retransmission. If the data sequence, i.e. packet, to be transmitted at a time is divided into four bursts, as convolutionally coded with rate 1/2, it is at best decodable for the receiver after receiving two bursts. If there is no need to transmit the two remaining bursts, the data sequence to be transmitted has been transmitted practically uncoded, i.e. with the realised coding rate 1/1, and there is no need to reserve capacity in the frame structure for the two remaining bursts. If the transmitter must send a third burst, the realised coding rate will be 3/4, and if also a fourth burst, 1/2. If the decoding still is not successful, the transmitting device retransmits the worst bursts. When it is diversity combined to an earlier burst, and the interleaving contained therein is unravelled, the realised coding rate is roughly 2/5. The process is continued in this fashion, and the realised coding rate decreases all the time, until at some stage the decoding is successful, or a given retransmission time limit prevents further retransmissions. This procedure satisfies the radio link adaptation characteristics, because the rate of realised coding and the capacity available on the basis thereof depends on the occurrence of radio frequency interference, and for all data, there is reserved only a necessary size of capacity in the frame structure.

In addition to the above described method, it is possible, in connection with nonreal-time data transmission, to use a method based on changing the modulation. Simultaneously with the changing of modulation, it is advantageous to change the interleaving depth in order to avoid recoding the already coded data sequences that are contained in the transmission buffer. If for example there is first employed a lower order modulation and interleaving depth 4, when moving over to a higher order modulation, the interleaving depth can be dropped to 2. Respectively, when moving over from a higher-order modulation to a lower-order-modulation, the interleaving depth can be increased. The decision for changing the modulation order is most advantageously based on the fact that the measured C/I ratio or the value of the function Q dependent thereon and describing the connection quality is compared with given threshold values, and if the C/I ratio or the value of the function Q is high in relation to said threshold values, there is assumed a higher order modulation; respectively, with a low C/I ratio or a low value of the function Q, a lower-order modulation is assumed. As examples of lower-order and higher-order modulation methods, let us point out BPSK (Binary Phase Shift Keying) and QPSK (Quadrature Phase Shift Keying). By applying a higher-order modulation method, more bits can be transmitted within the same period of time, but when the modulation modes approach each other, the transmission becomes more sensitive to the time dispersion, wherefore higher-order modulation methods tend to be suitable mainly in small cells, where the distances are short.

In non-real-time data transmission, relatively long pauses may occur in the transmission, because a regularly repeated capacity is not reserved for the transmission in the frame structure. From the point of view of radio link adaptation, pauses are harmful, because adaptation is at its most effective when measurements can be carried out constantly, and the detected changes can be rapidly responded to. In connection with non-real-time data transmission, the radio link adaptation can be combined with a timer that studies how long an interval has passed from the last C/I ratio measurement and determines, on the basis of the elapsed time and advantageously also the known relative speed between the mobile station and the base station, whether the earlier calculated values are still valid. If according to the timer the time elapsed from the last C/I ratio measurement surpasses a given limit value, in the next transmission there can be used, in order to make sure, certain "worst case" default values with respect to coding, modulation and interleaving, or there can be applied a similar method of agreement between the base station and mobile station as in connection with the bearer setup or handover. Another alternative is to apply, during the pauses, a similar estimation based on a channel common for the whole cell or on other transmission that was is explained above with reference to pauses occurring in real-time data transmission and resulting from discontinuous transmission. This kind of C/I ratio estimation based on a common cell channel can also be used prior to setting up the active connection proper.

In the above description, we have not commented on the question in which device (i.e. the base station or the mobile station) the functions aiming at the radio link adaptation are realised. It is advantageous to concentrate the control of the reservation situation of the frame structure in the base station, station handles all requests relating to reservation and release of capacity irrespective of whether they originate from the base station or the mobile stations. On the basis of the requests, the respective unit in the base station makes the necessary changes in the reservation tables describing the frame reservation situation and announces the awarded and cancelled slots for the unit and the mobile stations. The measurement of the C/I ratio related to a given bearer can only take place in the device that is receiving at each particular moment, but the invention does not restrict the implementation of the algorithm generating the capacity reservation and release requests as to whether it is realised both in the base station and in the mobile stations, or only in one of these. A receiving device that in itself does not have means for using an algorithm of the described type, can signal for another device the measured C/I ratio values, in which case said other device uses these values for generating possible capacity reservation and release requests. Likewise, an adjusting loop that operates on the basis of detected bit error ratio or frame error ratio (number of erroneous frames in relation to all frames) and optimises the parameter values used in radio link adaptation can function either in the mobile stations or in the base station or in both.

According to a preferred embodiment, both the algorithm generating capacity reservation and release requests on the basis of the C/I ratio and the adjusting loop optimising the parameters used in said algorithm are realised both in the mobile stations and the base station. Now the measured values of the C/I ratio, bit error ratio and/or frame error ratio do not have to be continuously transmitted as signalling between the separate devices, which decreases the total amount of signalling in the system. In the preferred embodiment, both the base station and the mobile station measure the C/I ratio in every received slot, as well as the bit error ratio and frame error ratio for the duration of each interleaving period. When necessary, averaging for the duration of several successive measurements can be applied in both measuring processes. In connection with bearer setup, the transmitting device indicates which are the basic parameters to be first used in connection with the bearer. If necessary, it is possible to apply, in the selection of basic parameters, an agreement protocol, where the receiving device either accepts or rejects the basic parameters indicated by the transmitting device, and in the case of rejection, the transmitting device suggests new basic parameter combinations, until it receives acceptance from the receiving device. During the use of the bearer, such changes in the basic parameters that aim at radio link adaptation can be transmitted according to how the signalling between the mobile station and the base station is arranged in general, for instance in the downlink at 20–500 ms intervals and in the uplink in packets only when necessary.

Let us next observe the adjusting of transmission power in the method according Ito the invention. In general, the adjusting of the transmission power aims at maintaining the transmission power connected to each bearer as low as possible, but, however, so that the S/N ratio (signal to noise ratio) connected to said bearer and detected by the receiving device at least conforms to a defined goal. In the invention the adjusting of the transmission power is connected to the above described radio link adaptation carried out on the basis of the connection quality or source data quantity: the adjusting of transmission power compensates noise, and other radio link adaptation compensates interference.

The adjusting of uplink and downlink transmission power takes place according to slightly different methods. The base station 401 can transmit messages connected to the adjusting of transmission power in the multiplexed fashion illustrated in FIG. 4 to all mobile stations by reserving in the frame structure 402 one slot 403 or part thereof for power adjusting messages and by packing the short power adjusting messages 404, 405 and 406 meant for all mobile stations successively in said slot or slot part. For the sake of clarity, the drawing illustrates only the power adjusting messages to be transmitted for the three mobile stations 407, 408 and 409. Among the adjusting messages, each mobile station interprets the relevant part. In the uplink direction, a power adjusting message transmitted by one mobile station takes up more space than a power adjusting message transmitted to one mobile station in the downlink direction, because between mobile stations functioning in the same cell, extremely accurate synchronisation does not exist, and hence for each uplink power adjusting message, there must be reserved a larger share of the frame structure than for a respective downlink power adjusting message.

In the power adjusting of an uplink transmission, there is most advantageously implemented a rapid $\Delta$ modulation which is based on estimating the losses on the radio path (so-called pathless based power adjusting). The rapidity here means that the base station transmits power adjusting messages to the mobile stations fairly often, most advantageously in every downlink frame. As a power adjusting method, $\Delta$ modulation means that the power adjusting commands are of the "step up" or "step down" type, and do not contain a command to use a determined absolute power. In the power adjusting of real-time data transmission, it is advantageous to apply a larger power adjusting step than in non-real-time data transmission. As a power adjusting method, instead of the $\Delta$ modulation there can also be used direct commanding, in which case the power adjusting command contains a reference to a given absolute value of the transmission power, which the transmitting device must start to use.

In connection with the bearer setup, the mobile station requests, according to the method illustrated in FIG. 5, a given initial power on the basis of the power by which it detects the general control channel regularly transmitted by the base station. This request is represented by block 501. In block 502, the base station permits the mobile station to start transmission 503 with a given initial power, the magnitude of which is defined by the power level requested by the mobile station, the highest allowed power level and the lowest allowed power level. Thereafter power adjusting is carried out on the basis of the power adjusting messages 504 or 505 regularly transmitted by the base station. In the power adjusting message, the base station commands the mobile station to reduce transmission power, if it has been detected that the received power in block 506 is higher than noise equivalent power for more than the target level, or to increase power level, if the difference of the received power and noise equivalent power is lower than the target level. The circulation in the loop formed by blocks 503, 504, 505 and 506 ends when the connection is ended (not illustrated in the drawing).

In the power adjusting of downlink transmission, there also is applied the estimation of radio path losses. The base station estimates a suitable initial power on the basis of the knowledge as to by which power a given control message was transmitted and received. Thereafter the mobile station transmits, whenever necessary, a power adjusting message for the base station, and the base station changes its transmission power on the basis of the received power adjusting message. The power adjusting message transmitted by the mobile station can contain either a plain measuring result that describes the power level on which the mobile station received the transmission from the base station, or a command transmitted by the mobile station to the effect of decreasing or increasing transmission power.

It is advantageous to parametrise the power adjusting algorithms in order to make their implementation as flexible as possible. In the following list, we enclose a preferred number of parameters that can be used in adjusting uplink transmission power. The names of the parameters are naturally given only by way of example. For parameters specifically designated as uplink parameters, corresponding downlink counterparts are easily defined by changing the UL in the parameter name by DL and "uplink" in the description by "downlink".

Contr_per_RT_UL

The length of the period that is processed at a time in power adjusting, i.e. during which the received power measurement is averaged. RT means real-time and UL uplink direction. In rapid power adjusting for instance 5 ms, and in slow 500 ms.

Contr_per_NRT_UL

The same as above, but not for non-real-time data transmission.

Step_size_RT_UL

The size of the power adjusting step. For example 1 dB.

Step_size_NRT_UL

The same as above, but not for non-real-time data transmission.

Dynamics_RT_UL

The size of the dynamic range in power adjusting. For example 20 dB.

Dynamics_NRT_UL

The same as above, but not for non-real-time data transmission.

P_noise

The noise equivalent power estimated by the receiving device in dBm units.

S_N_th_RT_UL

The goal level of the signal to noise ratio of the bearer. For example 20 dB.

S_N_th_NRT_UL

The same as above, but not for non-real-time data transmission. For example 10 dB.

Ptx_BCCH

Transmitted power in the general control channel (Broadcast Control Channel) in dBm units.

Prx_BCCH

Received power in the general control channel in dBm units.

Ptx

Transmitted power in the general traffic channel in dBm units.

Prx

Received power in the general traffic channel in dBm units.

Max_Pow_RT_UL

Highest allowed power in dBm units.

Max_Pow_NRT_UL

The same as above, but for non-real-time data transmission.

By the selection of the two last mentioned parameters, the operator maintaining the cellular radio system may be profiled either as an operator offering services based mainly on real-time data transmission (Max_Pow_RT_UL is relatively higher) or as an operator offering services based mainly on non-real-time data transmission (Max_Pow_NRT_UL is relatively higher). By selecting the parameter values, the operator can also in other ways control the operation of the network, for instance by selecting the maximum power and dynamic range values so that the interference between cells is as low as possible. The base stations may also contain algorithms whereby the parameter values are adapted to the prevailing traffic situation. For example the parameters S_N_th_RT_UL and S_N_th_NRT_UL (and correspondingly S_N_th_RT_DL and S_N_th_NRT_DL for the downlink) may be used to compensate for a general cell-wide change in the values of the parameters C_max and/or Q_th. Their values may also be chosen as a function of the parameter Q_less.

Next we shall look at the requirements that the realisation of the invention sets for the base station and the mobile station in a cellular radio system. A radio link adaptation based on connection quality requires that the receiving device can measure the C/I ratio in the received data most advantageously one burst at a time, which is already known as a signal processing operation. Moreover, the realisation of an adjusting loop aiming at parameter optimisation requires, that the receiving device can measure the bit error ratio in the decoded data. If we assume that the algorithms for generating capacity reservation and release requests are realised both in the base station and in the mobile station, both must have the necessary memory and processing means for executing the algorithms and for recording the parameters used therein. The realisation of algorithms as programmed processes represents technology known as such for a man skilled in the art.

Figure 6:
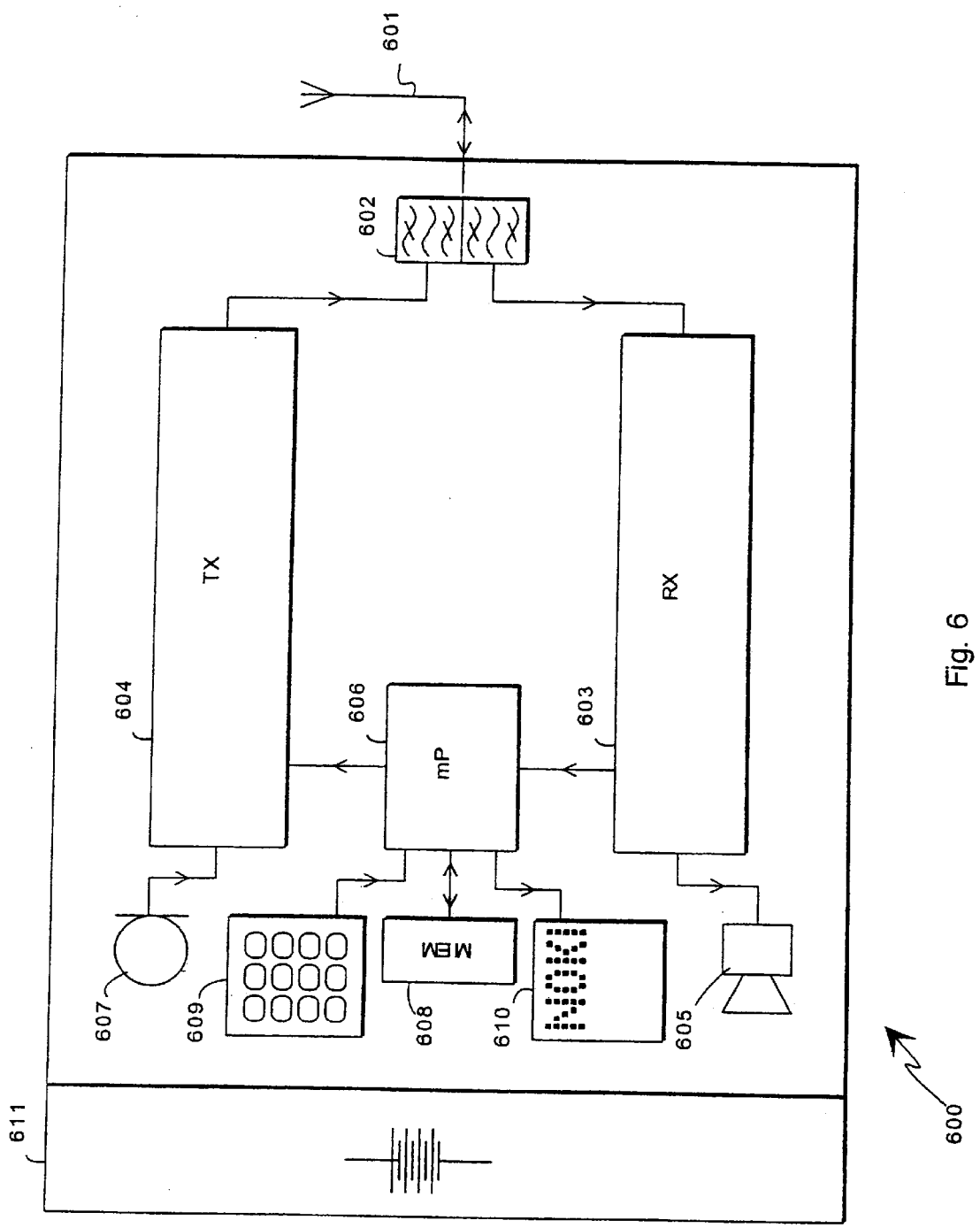
FIG. 6 illustrates a mobile telephone where the method according to the invention can be applied.

FIG. 6 illustrates a mobile phone 600 which can be used as the mobile station of a cellular radio system according to the invention. The illustrated mobile phone 600 comprises an antenna 601 and a connected duplex filter 602, where the reception-frequency signal received by the antenna 601 is directed to the receiver block 603, and the signal coming from the transmitter block 604 is directed to the antenna 601. The receiver block 603 comprises the usual reception, downmixing, demodulation and decoding functions by which a received radio-frequency signal is converted to an analog audio signal, which is then directed to the loudspeaker 605, and to data signals which are directed to the control block 606. The transmitter block 604 comprises the usual coding, interleaving, modulation and upmixing functions whereby the analog audio signal produced by the microphone 607 and the data signals fed in the control block 606 are converted to a transmittable radio-frequency signal. In addition to this, the mobile phone 600 comprises memory means 608, a keyboard 609, a display 610 and a power source 611.

The means for measuring the C/I ratio and the bit error ratio are contained in the receiver block 603. The control block 606, which generally is a microprocessor, executes the necessary algorithms and also in other ways controls the operation of the mobile phone, under the directions of the programmed recorded in the memory 608, and the keyboard commands given by the user and the system commands transmitted via the base station.

What is claimed is:

1. A method for adapting a radio connection to a changing environment in a cellular radio system comprising a base station and a multitude of mobile stations, both the base station and the mobile stations being capable of functioning as transmitting devices and as receiving devices, said method comprising the steps of:

arranging the radio traffic between the base station and the mobile stations on a multiple access principle according to a given frame structure, for a given connection between a transmitting device and a receiving device reserving a given data transmission capacity in said frame structure, during said given radio connection, using the receiving device to measure the connection quality, and as a response to a situation where the measured connection quality differs in a predefined way from a certain predetermined target level of connection quality, changing the size of data transmission capacity reserved for said radio connection in said frame structure;

wherein for measuring the connection quality the receiving device forms a value describing said radio connection and compares said value to a given threshold value, in which case a1) if said value describing the connection quality is lower than said threshold value, the size of data transmission capacity reserved in said frame for the radio connection in question is increased, and a2) if said value describing the connection quality is higher than said threshold value, there is formed an estimate of what would be the value describing the connection quality if a smaller data transmission capacity were reserved in said frame structure for said radio connection, and this estimate is compared to said threshold value, in which case b1) if said estimate is lower than said threshold value, the measurement of the connection quality is restarted, and b2) if said estimate is higher than said threshold value, the size of data transmission capacity reserved for said radio connection in said frame structure is reduced, and wherein said threshold value is a parameter, the value of which is changeable during the operation of the cellular radio system.

2. A method according to claim 1, wherein for measuring the connection quality the receiving device measures the carrier to interference ratio of the signal it receives.

3. A method according to claim 1, further comprising a phase where the load of a given base station is measured, so that as a response to a measuring result indicating a high load, the value of said threshold parameter is decreased.

4. A method according to claim 1, further comprising a phase where there is measured a value describing the quality of the data transmission connection between the base station and at least one mobile station, so that as a response for a measuring result indicating good quality, the value of said threshold parameter is decreased, and as a response for a measuring result indicating poor quality, the value of said threshold parameter is increased.

5. A method according to claim 1, wherein in step b2, the size of data transmission capacity reserved for said radio connection in said frame structure is increased only when it has been detected in C successive connection quality measurements that the estimate formed on the basis of the connection quality is higher than said threshold value, where C is a positive integer.

6. A method according to claim 5, wherein said positive integer C is a parameter with a value that is changeable during the operation of the cellular radio system.

7. A method according to claim 1, wherein in step b2, the size of data transmission capacity reserved for said connection in said frame structure is increased only after among N successive connection quality measurements it has been detected in M measurements that the estimate formed on the basis of the connection quality is higher than said threshold value, where N and M are positive integers and N>M.

8. A method according to claim 7, wherein at least one of said positive integers N and M is a parameter with a value that is changeable during the operation of the cellular radio system.

9. A method according to claim 1, wherein the receiving device measures, during a temporary pause occurring in a first radio connection, the connection quality of a second radio connection, and on the basis of the measured quality of the second radio connection, the size of data transmission capacity reserved for said first radio connection in said frame structure is changed.

10. A method according to claim 1, further comprising the steps of measuring at the transmitting device the amount of data to be transmitted during the radio connection, and on the basis of the measured amount of data to be transmitted during the radio connection, changing the size of data transmission capacity reserved for said radio connection in said frame structure.

11. A method according to claim 1, further comprising the step of adjusting the transmission power of the transmitting device.

12. A mobile station for a cellular radio system comprising:

means for receiving signals, transmitted by a base station of the cellular radio system according to a certain frame structure, in a given part of said frame structure reserved for said mobile station, said part of the frame structure having a defined data transmission capacity, means for measuring the quality of the radio connection between said mobile station and the base station of the cellular radio system, said measuring means forming a value describing said radio connection quality and comparing said value to a given threshold value comprising a parameter the value of which is changeable during the operation of the cellular radio system, and producing an output indicative of said comparison, means, responsive to said output, for increasing the size of data transmission capacity reserved in said frame for the radio connection in question, if said value describing said radio connection quality is lower than said threshold value, means, responsive to said output, for forming an estimate of what would be the value describing said radio connection quality if a smaller data transmission capacity were reserved in said frame structure for said radio connection, and for comparing this estimate to said threshold value, if said value describing said radio connection quality is higher than said threshold value, means, if said estimate is lower than said threshold value, for restarting the measurement of the connection quality, means, if said estimate is higher than said threshold value, for reducing the size of data transmission capacity reserved for said radio connection in said frame structure, and means for transmitting to the base station, as a response to a situation where the measured radio connection quality differs in a predefined way from a certain predetermined target level of connection quality, a request for changing the data transmission capacity in said part of the frame structure reserved for said mobile station.

13. A mobile station according to claim 12, further comprising means for measuring the signal to interference ratio of the radio signal transmitted by the base station and for announcing the measured signal to interference ratio results for the base station in order to adjust the transmission power of the base station.

* * * * *